(12) United States Patent
Lai et al.

(10) Patent No.: US 11,196,754 B1
(45) Date of Patent: Dec. 7, 2021

(54) SYSTEMS AND METHODS FOR PROTECTING AGAINST MALICIOUS CONTENT

(71) Applicant: CA, Inc., San Jose, CA (US)

(72) Inventors: Everett Lai, Monterey Park, CA (US); Tamas Rudnai, Walnut, CA (US)

(73) Assignee: CA, INC., San Jose, CA (US)

( * ) Notice: Subject to any disclaimer, the term of this patent is extended or adjusted under 35 U.S.C. 154(b) by 246 days.

(21) Appl. No.: 16/452,298

(22) Filed: Jun. 25, 2019

(51) Int. Cl.
*H04L 29/06* (2006.01)

(52) U.S. Cl.
CPC ........ *H04L 63/126* (2013.01); *H04L 63/1408* (2013.01); *H04L 63/1433* (2013.01); *H04L 63/1441* (2013.01)

(58) Field of Classification Search
CPC ............... H04L 63/126; H04L 63/1408; H04L 63/1433; H04L 63/1441
See application file for complete search history.

(56) References Cited

U.S. PATENT DOCUMENTS

| | | | | |
|---|---|---|---|---|
| 5,832,208 A * | 11/1998 | Chen | ...................... | G06F 21/564 726/24 |
| 5,889,943 A * | 3/1999 | Ji | ............................ | H04L 29/06 726/22 |
| 7,865,953 B1 * | 1/2011 | Hsieh | .................. | G06F 16/9566 726/22 |
| 8,087,086 B1 * | 12/2011 | Lai | .......................... | G06F 21/56 726/24 |
| 8,813,222 B1 * | 8/2014 | Codreanu | ................ | G06F 21/56 726/22 |
| 9,407,650 B2 * | 8/2016 | Niemela | .............. | H04L 63/1408 |
| 9,774,615 B1 * | 9/2017 | Roundy | ................. | H04L 63/101 |
| 10,397,272 B1 * | 8/2019 | Bruss | ..................... | G06F 21/568 |
| 2010/0169972 A1 * | 7/2010 | Kuo | ........................ | G06F 21/564 726/23 |
| 2011/0282997 A1 * | 11/2011 | Prince | ................ | G06Q 30/0277 709/226 |
| 2013/0346472 A1 * | 12/2013 | Wheeldon | ............... | H04L 67/02 709/203 |
| 2015/0156203 A1 * | 6/2015 | Giura | ................... | H04L 63/0281 726/4 |
| 2017/0155665 A1 * | 6/2017 | Dufour | ............... | H04L 63/1408 |
| 2018/0084002 A1 * | 3/2018 | Shnitzer | ................ | H04L 63/168 |
| 2019/0182269 A1 * | 6/2019 | Lee | ...................... | H04L 63/1416 |
| 2020/0007575 A1 * | 1/2020 | Meriot | ................ | H04L 63/1458 |
| 2020/0204572 A1 * | 6/2020 | Jeyakumar | ............... | H04L 51/12 |
| 2020/0342106 A1 * | 10/2020 | Chelarescu | ......... | G06F 11/1458 |
| 2020/0351300 A1 * | 11/2020 | Kaidi | .................... | H04L 51/063 |

* cited by examiner

*Primary Examiner* — Sarah Su
(74) *Attorney, Agent, or Firm* — Foley & Lardner LLP

(57) ABSTRACT

The disclosed computer-implemented method for protecting against malicious content may include intercepting, by a security application installed on the computing device, an original message intended for a target application installed on the same computing device. The original message may include potentially malicious content. The security application may forward the original message to a security service. The computing device may receive a clean message from the security service, wherein the clean message includes a safe representation of the potentially malicious content. Various other methods, systems, and computer-readable media are also disclosed.

20 Claims, 8 Drawing Sheets

SYSTEMS AND METHODS FOR PROTECTING AGAINST MALICIOUS CONTENT

BACKGROUND

Malicious software is an ever-present threat to modern computing systems. As more data is shared, the opportunity for malicious software to spread between computing devices is increased. Conventional solutions typically protect against malicious software by scanning files to determine if they contain certain characteristics of malicious software. For example, malicious software may contain known segments of code, known signatures, or behave in a suspicious manner when executed.

Malicious actors, however, are continually attempting to thwart computer security solutions, often through the use of a variety of different and ever-changing attack vectors. For example, for a high value target, a malicious actor may even customize an attack vector for the high value target. If an attack vector is not readily protected by a security solution, then the security is left up to the user, who may not be computer savvy enough to recognize the potential threat.

SUMMARY

As will be described in greater detail below, the present disclosure describes various systems and methods for protecting against malicious content.

In one example, a method for protecting against malicious content may include intercepting, by a security application installed on a computing device, an original message containing potentially malicious content intended for a target application installed on the same computing device, forwarding, by the security application, the original message to a security service, and receiving, from the security service, a clean message having a safe representation of the potentially malicious content.

In some examples, the method further includes filtering, by the security application, the original message to determine it is potentially malicious. In some examples, the original message is forwarded to the security service in response to a determination the original message is potentially malicious.

In some examples, the method further includes registering the security application with an operating system of the computing device to intercept messages intended for a target application.

In some examples, the method further includes blocking a rendering of the original message by the target application.

In some examples, the potentially malicious content includes a universal resource locator (URL) and the safe representation includes a replacement URL identifying a safe representation of a resource identified by the URL. In some examples, the URL references an original web page and the replacement URL references a PDF representation of the webpage, an image of the webpage, or a modified version of the webpage.

In some examples, the potentially malicious content includes a universal resource locator (URL) and the clean message includes the same URL, and the security service includes a proxy server configured to serve a safe representation of content identified by the URL to the computing device.

In some examples, the clean message is received by the security application.

In some examples, the clean message is received by the target application. In some examples, the original message includes a source address and the clean message identifies the source address as a clean message source.

In some examples, the security service is local to the computing device, and the method further includes replacing the potentially malicious content with a safe representation of the potentially malicious content.

In some examples the original message has a source address and the method further includes generating a proxy address associated with the original message, receiving a reply message addressed to the proxy address associated with the original message, and forwarding, the reply message to the source address.

In some examples, the security service is located remote from the computing device.

In one embodiment, a system for protecting against malicious content may include at least one physical processor and physical memory that includes computer-executable instructions that, when executed by the physical processor, cause the physical processor to intercept an original message containing potentially malicious content intended for a target application, forward, by the security application, the original message to a security service, and receiving, from the security service, a clean message having a safe representation of the potentially malicious content.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to intercept, by a security application installed on a computing device, an original message intended for a target application installed on the same computing device, wherein the original message includes potentially malicious content, forward, by the security application, the original message to a security service, and receive, from the security service, a clean message, wherein the clean message includes a safe representation of the potentially malicious content.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
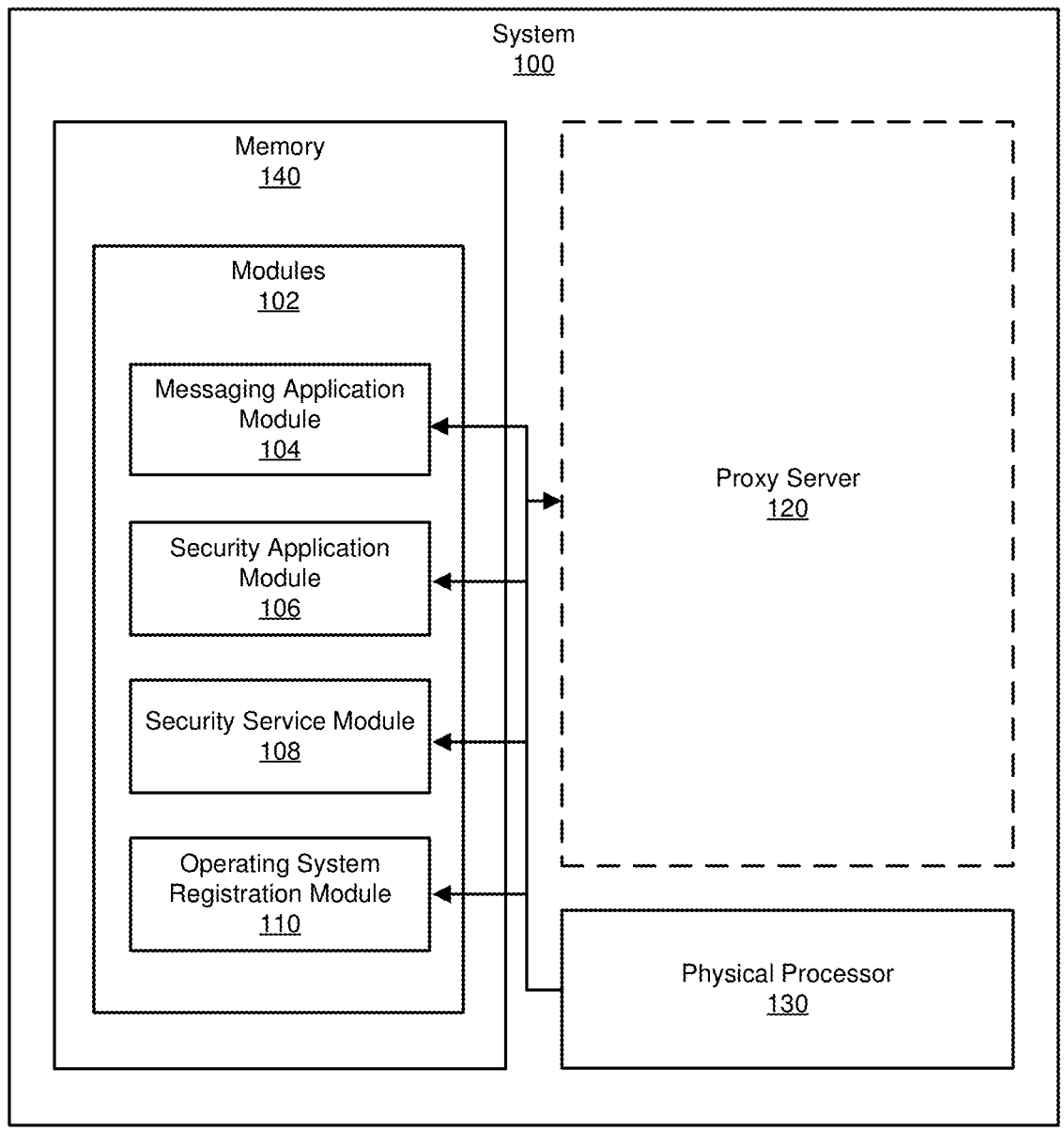
FIG. 1 is a block diagram of an example system for protecting against malicious content.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting against malicious content distributed via messaging services, such as text-based SMS and MMS messaging services and mobile messaging applications such as IMESSAGE, WHATSAPP, etc. (collectively referred to as "text messages" herein). Conventional security software typically does not scan or analyze text messages for malicious content for a variety of reasons. For example, conventional security software may not treat text messages as a security threat since they often contain only text. However, even messages containing only text may be a threat. For instance, a text message may contain a text-based link to malicious content, such as a trojan-horse file, a malicious executable, a virus infected document, a phishing website, or other potential threat. Or, in another example, a text message may include a link to a phishing website. Thus, by failing to address text messages, conventional security software may leave end users open to attack. Even if a security software application does scan text messages sent/ received by a particular messaging application for malicious content, many messaging applications (such as IMESSAGE) prevent third-party applications (including security software) from modifying messages sent/received by the messaging application, which may effectively prevent the security software from being able to remediate any security issues the security software identifies.

The present systems and methods, in contrast, may protect computing devices from malicious text messages that may otherwise go unprotected. For example, the systems and methods described herein may intercept a potentially malicious text message and forward the potentially malicious text message to a security service, which may in turn generate and forward a clean copy of the potentially malicious message. By doing so, the disclosed systems and methods may be able to protect computing devices against a variety of different text-based attack vectors, even if the text messaging application that originally delivered the compromised message prevents the same from being altered before to a user.

In some examples, the disclosed systems may intercept the above-described messages by registering a filter with an operating system installed on the computing device. For example, the disclosed security application may register as a text message spam filter with IOS®. In this example, the operating system may deliver intercepted text messages to the security application. The security application may then forward the messages to a security service, which may analyze the same for malicious content and replace the malicious content with clean content. For example, a link to a malicious website may be replaced with a link to safe website that has had the malicious content removed. The resulting clean message may then be received by the computing device and displayed to the user by the security application, or in some examples, the original text message application.

The systems and methods described herein may improve the functioning of a computing device by protecting end users against malicious content contained in text messages while still allowing the users to access any benign content contained therein. The systems and methods may further improve the field of computer security by identifying and securing potential threat vectors (such as text messaging applications) that may have previously been unreported or undetected.

Figure 2:
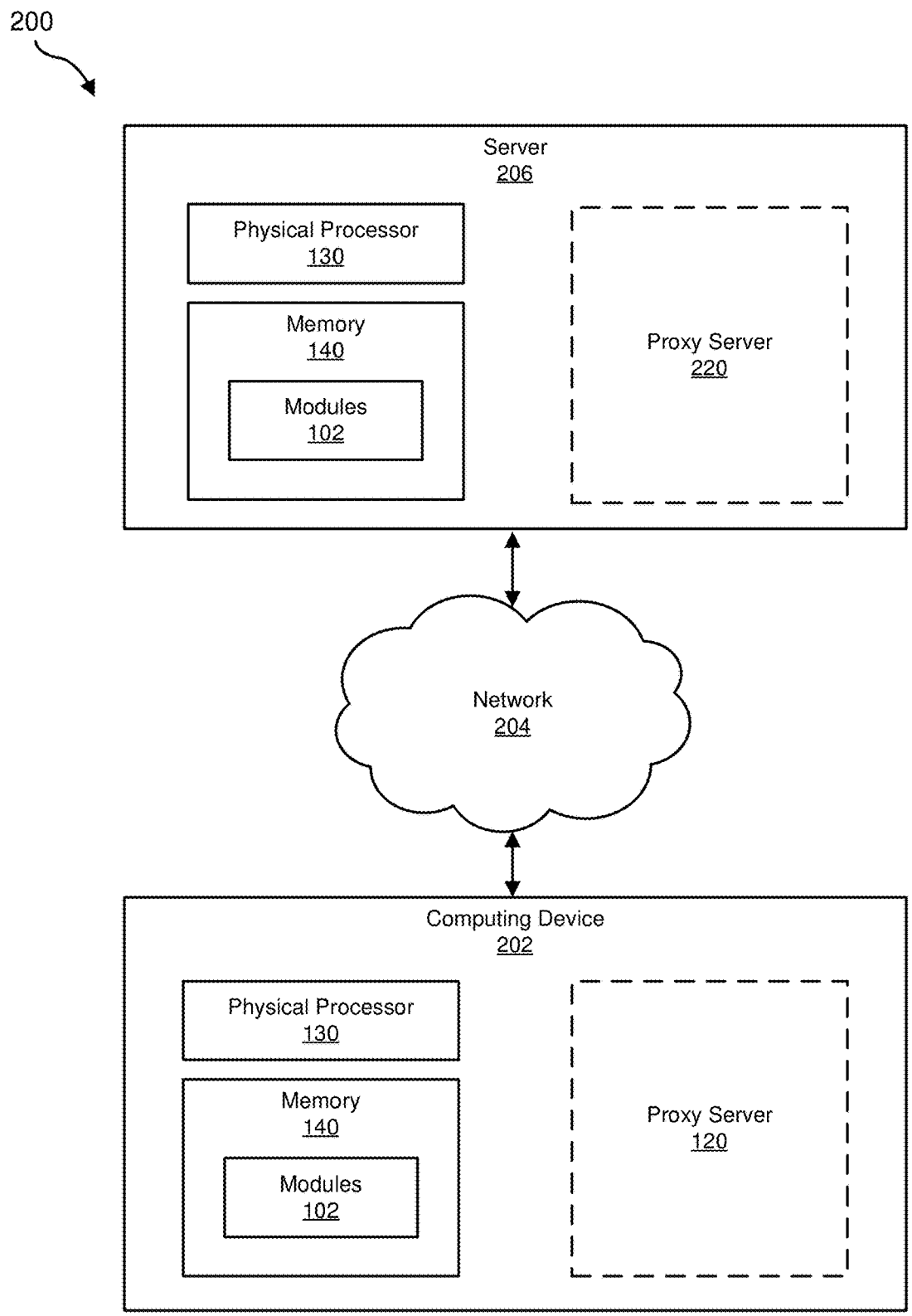
FIG. 2 is a block diagram of an additional example system for protecting against malicious content.

The following will provide, with reference to FIGS. 1-2, detailed descriptions of example systems for protecting against malicious content. Detailed descriptions of corresponding computer-implemented methods will also be provided in connection with FIGS. 3 and 4. Detailed descriptions of a messaging application with be provided in connection with FIG. 4. Detailed descriptions of a security application will be provided in connection with FIG. 5. Detailed descriptions of an alternative messaging application will be provided in connection with FIG. 6. In addition, detailed descriptions of an example computing system and network architecture capable of implementing one or more of the embodiments described herein will be provided in connection with FIGS. 7 and 8, respectively.

FIG. 1 is a block diagram of an example system 100 for protecting against malicious content. As illustrated in this figure, example system 100 may include one or more modules 102 for performing one or more tasks. As will be explained in greater detail below, modules 102 may include a messaging application module 104, a security application module 106, a security service module 108, and an operating system registration module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate protecting against malicious content. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements, such as proxy server 120. Proxy server 120 generally represents any type or form of server capable of acting as an intermediary to a client seeking services from other servers. In one example, proxy server 120 may be a web filtering proxy server capable of intercepting requests for malicious web sites and serving a sanitized version of a web site in response to the request.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to protect against malicious content. For example, and as will be described in greater detail below, one or more of modules 102 may cause computing device 202 and/or server 206 to intercept an original message intended for a target application, forward the original message to a security service, and receive, from the security service, a clean message that includes a safe representation of the potentially malicious content filter. Additionally, the one or more module may cause computing device 202 and/or server 206 to filter the original message to determine that it contains potentially malicious content and/or block a rendering of the original message by the target application.

Computing device 202 generally represents any type or form of computing device capable of reading computer-executable instructions. In one example, the computing device 202 may be a mobile device having a text messaging application. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of providing services, such as a security service for detecting malware and/or a proxy service. Additional examples of server 206 include, without limitation, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Proxy server 220 generally represents any type or form of server capable of acting as an intermediary to a client seeking services from other servers. In one example, proxy server 220 may be a web filtering proxy server capable of intercepting requests for malicious web sites and serving a sanitized version of a web site in response to the request.

Figure 3:
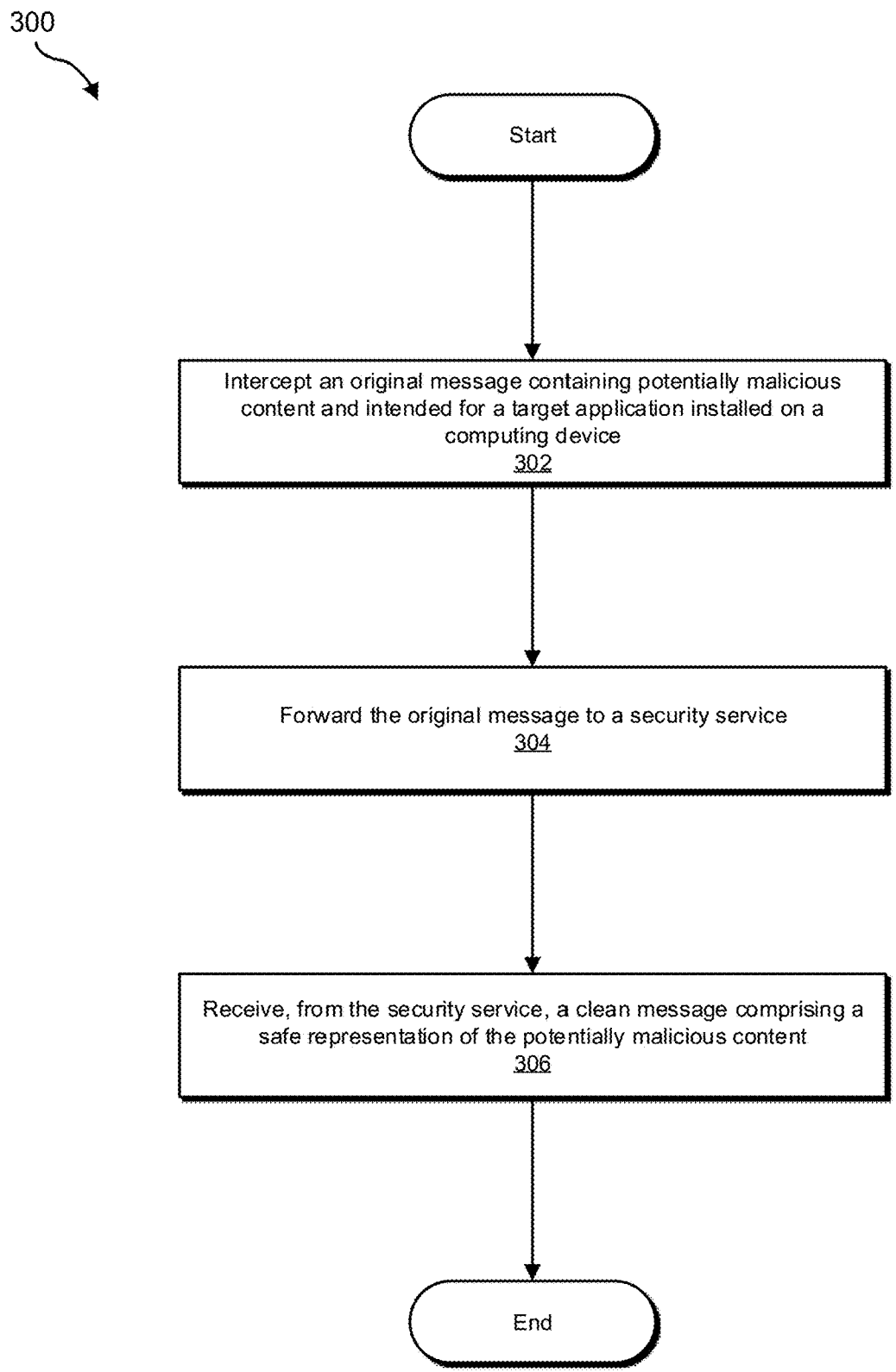
FIG. 3 is a flow diagram of an example method for protecting against malicious content.

FIG. 3 is a flow diagram of an example computer-implemented method 300 for protecting against malicious content. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may intercept an original message containing potentially malicious content intended for a target application. For example, as part of computing device 202 in FIG. 2, a text message may be intended for a target text message application and a security application may intercept the text message. In some examples, an operating system of the computing device 202 may intercept the message before it arrives at the target application. For example, the operating system may redirect messages intended for the target application to the security application.

The term "malicious content," as used herein, generally refers to digital content potentially harmful to a computing device or developed with a malicious intent. Examples of malicious content include, without limitation, malware, fraudulent messages, deceptive messages, attached malware, computer exploits, ransomware, remote access tools, unwanted software, and links to the same.

The term "intercept," as used herein, generally refers to interrupting a process of delivering the original message to the target application module for rendering. Examples of intercepting a message include, without limitation, rerouting delivery of an original message from a target application to another application and forwarding the original message from the target application to another application.

The systems described herein may perform step 302 in a variety of ways. In one example, the original message may be rerouted by an operating system of the computing device 202 such that the original message is delivered to a security application implemented by security application module 106 in place of a messaging application implemented by the messaging application module 104. For example, during installation of security application module 106, operating system registration module 110 may register a filter with the operating system to redirect messages from the messaging application to the security application. In another example, the original message may be forwarded by the messaging application to the security application. For example, a user may manually configure the messaging application to forward messages to the security application.

In some examples, the method may further include blocking the computing system from displaying the original message. For example, one or more of the systems described herein may block a rendering of the original message. In one example, the original message may not be received by the target application. In such examples, the target application would not have an opportunity to render the original message. For example, the operating system of the computing device 202 may prevent the original message from being delivered to the messaging application and may instead deliver the original message to a security application implemented by security application module 106. Or in some examples, the messaging application may receive the original message but forward the original message before having an opportunity to render the original message.

As illustrated in FIG. 3, at step 304 one or more of the systems described herein may forward the original message to a security service. For example, security application module 106 may, as part of computing device 202, forward the original message to a security service. In some examples, the security service may be remote from computing device 202 and implemented at server 206. In other examples, the security service may be implemented by security service module 108 and be local to computing device 202.

The term "security service" as used herein, generally refers to a service that detects potentially malicious content and sanitizes the potentially malicious content to produce a clean representation of the potentially malicious content.

The term "clean representation" as used herein, generally refers to a representation of original content sanitized to remove potentially malicious content while still conveying an original meaning of the content. For example, a clean representation of a file may be a version of the file having malicious code removed, a clean representation of an image file may be a version of the image file having malicious code removed, a clean version of a website may be a screenshot of the website contents, a Portable Document Format (PDF) document illustrating the website content, or a sanitized version of a website with malicious code removed, and a clean version of a link may be a new link pointing to a sanitized version of content at the original link.

The systems described herein may perform step 304 in a variety of ways. In one example, the security application implemented by security application module 106 may forward the original message to a security service implemented by security service module 108 executing at computing device 202. In another example, the security application may forward the original message over network 204 to a security service implemented by a security service module 108 executing at a server 206 remote from computing device 202.

In some examples, one or more of the systems described herein may filter the original message intended for a target application to determine whether the original message contains potentially malicious content. For example, a security application implemented by security application module 106 may, as part of computing device 202 in FIG. 2, inspect an original message to determine whether the original message contains malicious content.

The systems described herein may filter the original message in a variety of ways. In one example, the security application may analyze each original message to determine if the original message contain potentially malicious content. Each original message identified as containing potentially malicious content may then be forwarded to a security service as described previously, while messages not determined to contain potentially malicious content may be designated as clean.

As illustrated in FIG. 3, at step 306, one or more of the systems described herein may receive a clean message comprising a safe representation of the potentially malicious content from the security service. In some examples, the security application module 106 may, as part of computing device 202, receive the clean message from the security service whether implemented local to computing device 202 or over network 204 from a server 206. In some examples, message application module 104 may, as part of computing device 202, receive the clean message whether implemented local to the computing device or over network 204 from a server 206.

Figure 4:
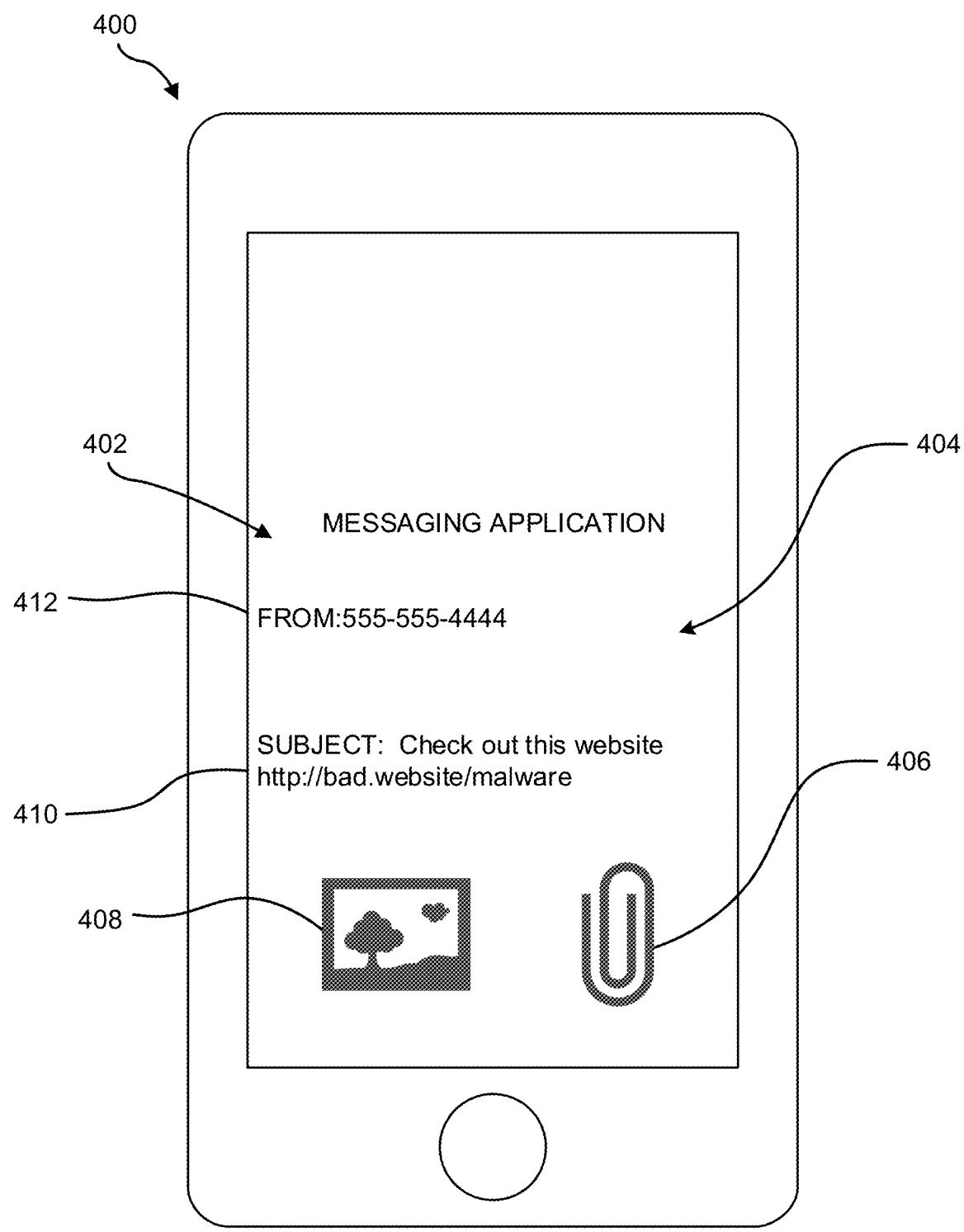
FIG. 4 is an example of a messaging application displaying a potentially malicious message.

FIG. 4 illustrates an example mobile device 400 (such as system 100 in FIG. 1) running an example messaging application 402. In this example, messaging application 402 is displaying an example of an original message 404. Although FIG. 4 depicts original message 404 being displayed on mobile device 400, in some examples original message 404 may be blocked from display on mobile device 400. However, for clarity original message 404 will be described as it would appear on a mobile device 400 if it were to be displayed. In some examples, all messages intended for messaging application 402 may be treated as having potentially malicious content. In other examples, the security application may inspect original message 404 to determine if original message 404 contains potentially malicious content. In some examples, the security application may inspect original message 404 and determine it is potentially malicious because it contains one or more of an attachment 406, an image 408, or a link 410 to a website, or original message 404 is potentially malicious because original message 404 is from an unknown sender, a suspicious sender, or other identification of the sender. In some examples, the security application may identify a sender based on a characteristic of the original message such as a telephone number 412, an email address, a name, a user name or other identifiers.

Figure 5:
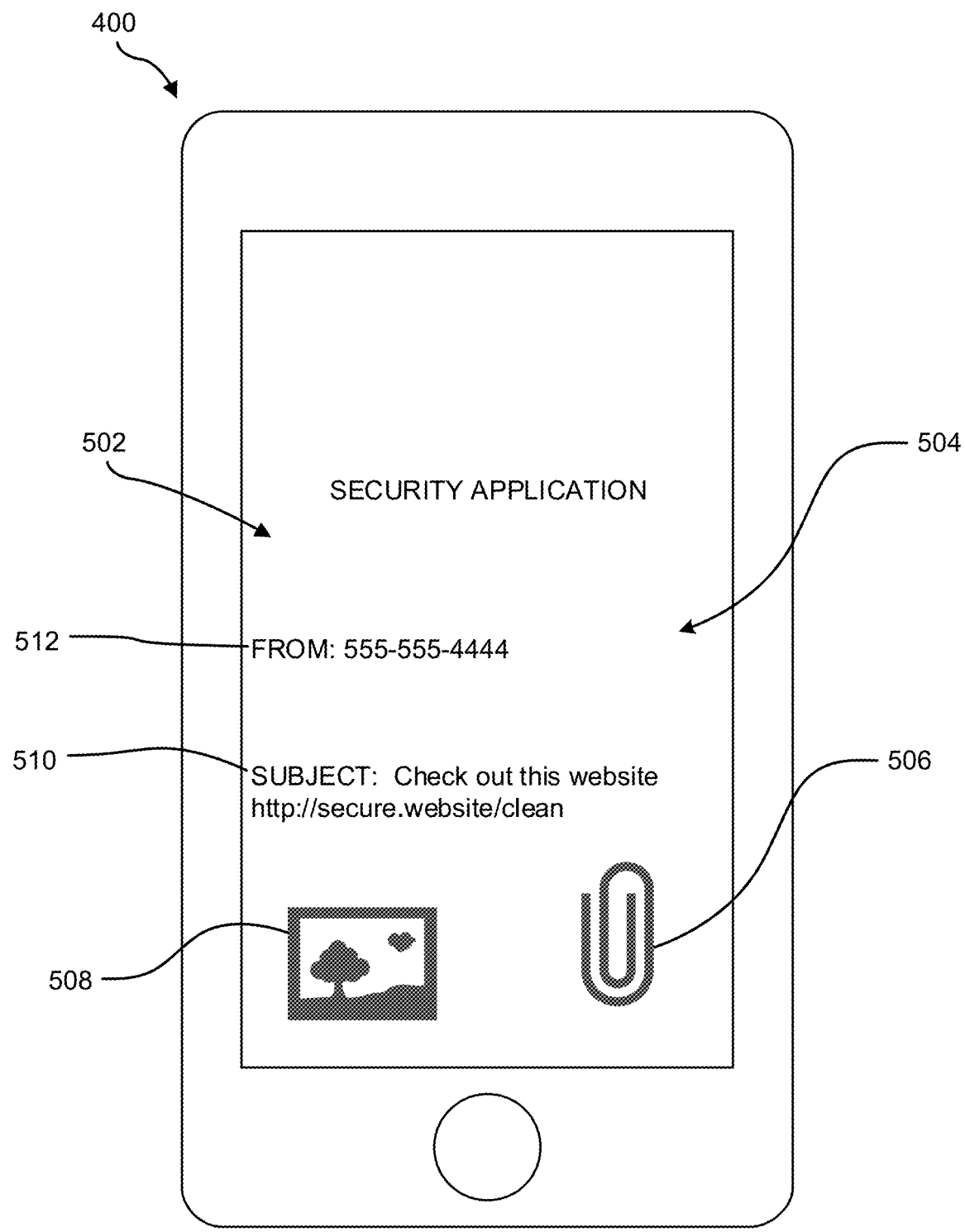
FIG. 5 is an example of a security application displaying a clean representation of the potentially malicious message.

FIG. 5 illustrates example mobile device 400 implementing an example security application 502. In this example, security application 502 is displaying a clean message 504 corresponding to original message 404. clean message 504 may include a sanitized attachment 506, a sanitized image 508, and/or a sanitized text link 510. The security service may sanitize original message 404 to produce clean message 504. In some examples, the security service may recognize potentially malicious content in the form of a link in original message 404. In such examples, the security service may update a proxy server, such as proxy server 120 or proxy server 220 to serve a sanitized version of the potentially malicious content identified at the link in response to receiving a content request. original message 404 may then correspond to a clean message 504, since the potentially malicious content at link 410 has been replaced with sanitized content.

Figure 6:
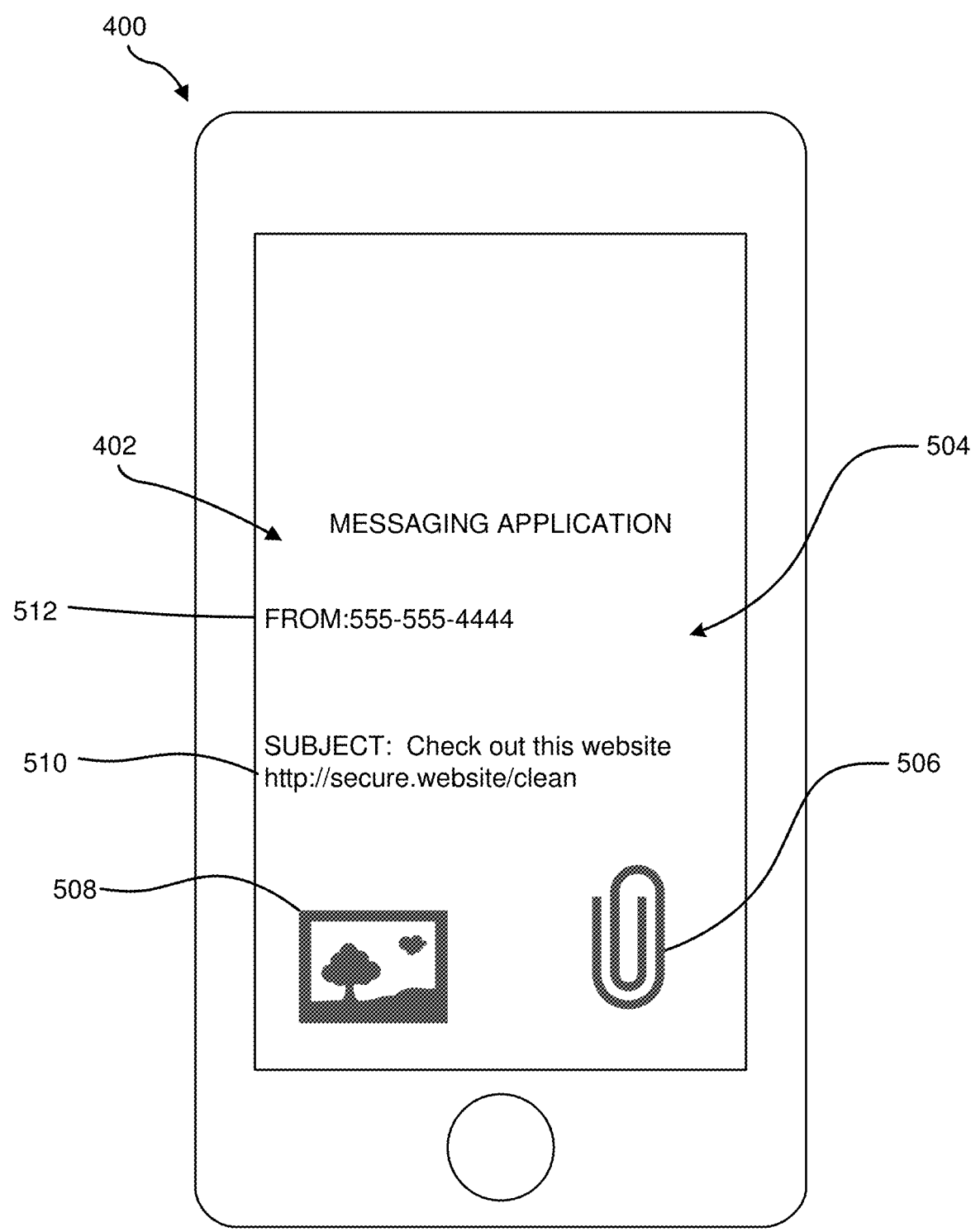
FIG. 6 is an example of a messaging application displaying a clean representation of the potentially malicious message.

FIG. 6 illustrates example mobile device 400 implementing example messaging application 402 but displaying clean message 504 corresponding to original message 404. The clean message 504 may include a sanitized attachment 506, a sanitized image 508, and/or a sanitized text link 510. In some examples, original message 404 depicted in FIG. 4 may be blocked from display by messaging application 402 and clean message 504 may be displayed in place of original message 404. For example, the operating system or messaging application may filter all messages except for messages containing a token, such as a such as an identifier corresponding to a cryptographic hash of the clean message which may be verified by the security service. The security service may append the token to all clean messages such that when computing system 202 receives the clean messages, they are delivered to the messaging application without being rerouted to the security application.

Returning to FIG. 3 and with reference to FIGS. 4, 5, and 6, the systems described herein may perform step 306 in a variety of ways. For example, security application 502 may receive clean message 504 through a different band than a band original message 404 received clean message 504. In some examples, original message 404 may be a SMS text message delivered by an SMS text service, while clean message 504 may be a message delivered to security application 502 over different messaging protocol such as a secure messaging/communication protocol like https or SIGNAL. Or, in some examples, clean message 504 may be received over the same band as original message 404. For example, clean message 504 may be delivered to security application 502 by SMS text message. In such examples, the operating system of computing device 202 or messaging application 402 may forward clean message 504 to security application 502 for viewing, or, in some examples, clean message 504 may be viewed at the messaging application.

In some examples, clean message 504 may have a spoofed source address. For example, original message 404 may have source sender identification, which may be phone number 412 identified in FIG. 4. Security application 502 may then display clean message 504 with a source sender identification, such as phone number 512, as being from original source sender identification. Or in examples in which clean message 504 is displayed by messaging application 404, clean message 504 may indicate source sender identification, such as phone number 512, is the same source sender identification as original message 404. Thus, a reply to clean message 504 will be routed to the original source and not to the security service that generated the message.

In some examples, proxy server 120 may generate a proxy address for each sender of an original message 404 and forward subsequent replies to the original sender. For example, in embodiments having an original message 404 with a telephone number 412 as a source identifier, clean message 504 may have a different source phone number 512 corresponding to proxy server 120. A reply to clean message 504 is then routed to proxy server 120, which then forwards the replay to original message telephone number 412. In some examples, proxy server 120 may further spoof the source reply source address such that the reply message indicates messaging application 404 as its source.

The described systems and method provide for protection against malicious content that may be delivered through a text messaging threat vector. Text messaging applications often do not allow for modification of the contents of a message, so solutions previously may be limited to either delivering a message containing potential malicious content or blocking the message altogether. The described systems and methods allow a message containing potentially malicious content to be delivered to a user while providing a level of protection by producing a clean version of the message. The systems and methods implement a security application to intercept messages intended for a target application, forward the messages to a security service to produce a clean message, and then present the clean message to the user. The process may be transparent to the user and utilize the target application to display the clean message, or in some examples the security application may display the clean message.

Figure 7:
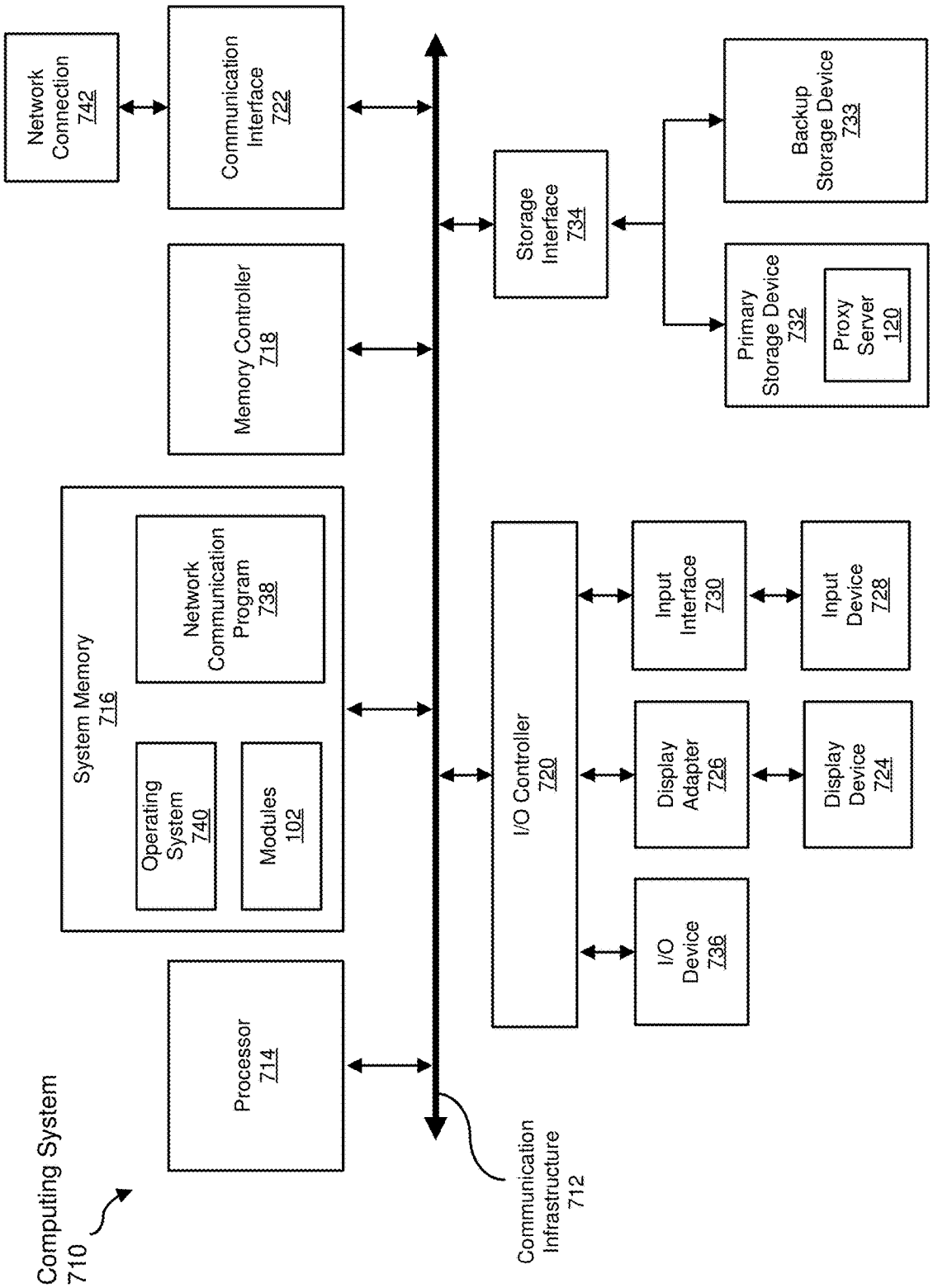
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, proxy server 120 from FIG. 1 may be stored and/or loaded in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
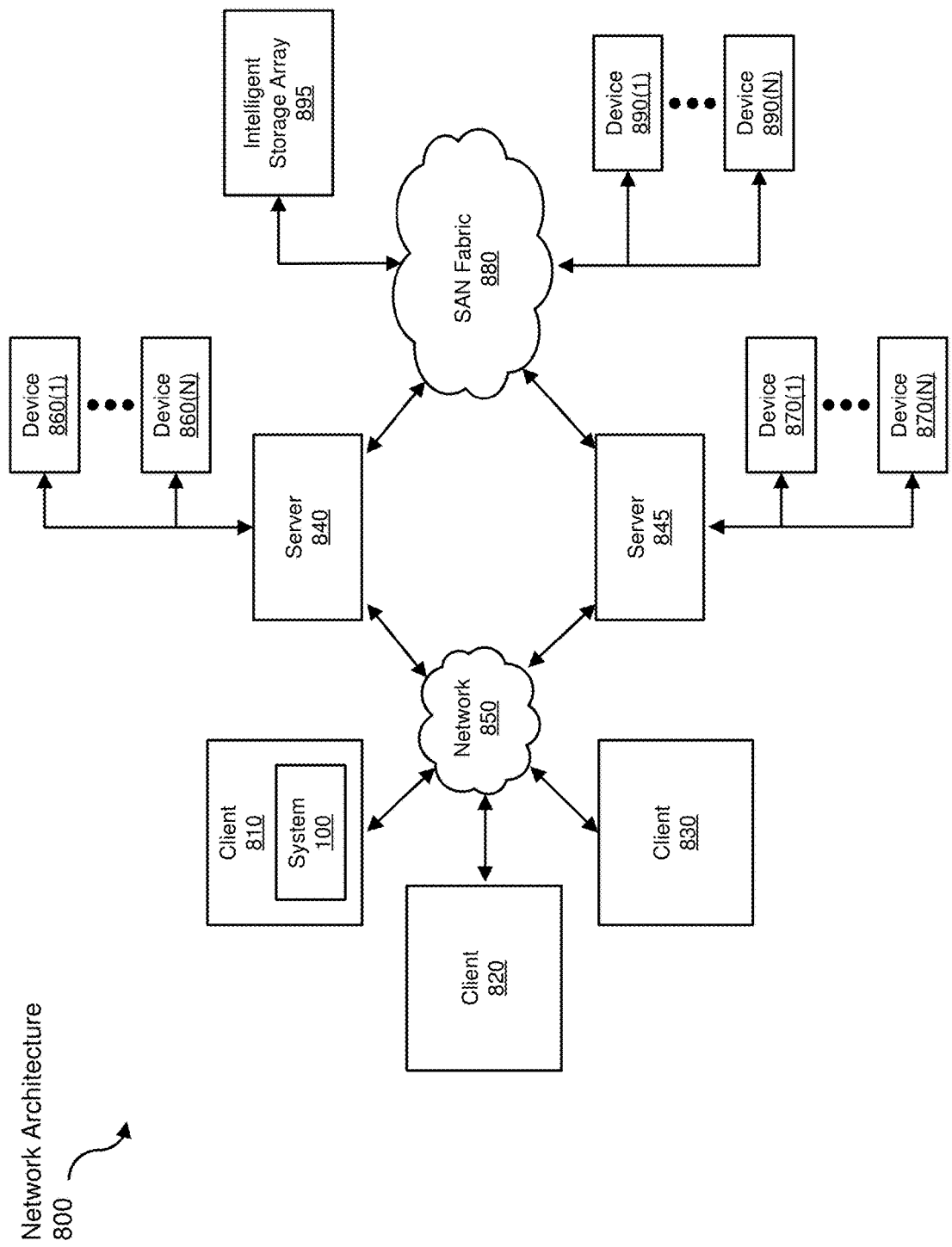
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the present disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network intercepting, by a security application installed on the computing device, an original message intended for a target application installed on the same computing device. The original message may include potentially malicious content. The security application may forward the original message to a security service. The computing device may receive a clean message from the security service, wherein the clean message includes a safe representation of the potentially malicious content. Various other methods, systems, and computer-readable media are also disclosed. 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for protecting against malicious content.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive an original message to be transformed, transform the message into a clean message, output the clean message to a user for consumption, and use the clean message to display a safe representation of the original message. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting against malicious content, at least a portion of the method being performed by a computing device comprising at least one processor, the method comprising:
   intercepting, by a security application installed on the computing device, an original message intended for a target application installed on the same computing device, wherein the original message comprises potentially malicious content and wherein the potentially malicious content comprises a universal resource locator (URL);
   forwarding, by the security application, the original message to a security service; and
   receiving, from the security service, a clean message, wherein the clean message comprises a safe representation of the potentially malicious content, wherein the clean message comprises the same URL, and wherein the security service comprises a proxy server configured to serve the safe representation of the potentially malicious content identified by the URL to the computing device.

2. The method of claim 1, further comprising:
   filtering the original message to determine that it is potentially malicious, wherein the original message is forwarded to the security service in response to a determination that the original message is potentially malicious.

3. The method of claim 1, further comprising registering the security application with an operating system of the computing device to intercept messages intended for the target application.

4. The method of claim 1, further comprising blocking a rendering of the original message by the target application.

5. The method of claim 1, wherein the safe representation comprises a replacement URL identifying the safe representation of the potentially malicious content identified by the URL.

6. The method of claim 5, wherein the URL references an original webpage and the replacement URL references a PDF representation of the webpage, an image of the webpage, or a modified version of the webpage.

7. The method of claim 1, wherein the clean message is received by the security application.

8. The method of claim 1, wherein the clean message is received by the target application.

9. The method of claim 8, wherein the original message comprises a source address and wherein the clean message identifies the source address as a clean message source.

10. The method of claim 1, wherein the security service is local to the computing device, the method further comprising replacing the potentially malicious content with the safe representation of the potentially malicious content.

11. The method of claim 1, wherein the original message has a source address, the method further comprising:
   generating, by the proxy server, a proxy address associated with the original message;
   receiving, by the proxy server, a reply message addressed to the proxy address associated with the original message; and
   forwarding, the reply message to the source address.

12. A system for protecting against malicious content, the system comprising:
   at least one physical processor;
   physical memory comprising computer-executable instructions that, when executed by the physical processor, cause the physical processor to:
      intercept, by a security application installed on the system, an original message intended for a target application installed on the same system, wherein the original message comprises potentially malicious content and wherein the potentially malicious content comprises a universal resource locator (URL);
      forward, by the security application, the original message to a security service; and
      receive, from the security service, a clean message, wherein the clean message comprises a safe representation of the potentially malicious content, wherein the clean message comprises the same URL, and wherein the security service comprises a proxy server configured to serve the safe representation of the potentially malicious content identified by the URL to the computing device.

13. The system of claim 12, wherein the computer-executable instructions further cause the physical processor to:
filter, by the security application, the original message to determine that it is potentially malicious, wherein the original message is forwarded to the security service in response to a determination that the original message is potentially malicious.

14. The system of claim 12, wherein the computer-executable instructions further cause the physical processor to:
register the security application with an operating system to intercept messages intended for the target application.

15. The system of claim 12, wherein the computer-executable instructions further cause the physical processor to block a rendering of the original message by the target application.

16. The system of claim 12, wherein the safe representation comprises a replacement URL identifying the safe representation of the potentially malicious content identified by the URL.

17. The system of claim 12, wherein the computer-executable instructions further cause the physical processor to replace the potentially malicious content with the safe representation of the potentially malicious content.

18. A non-transitory computer-readable medium comprising one or more computer-executable instructions that, when executed by at least one processor of a computing device, cause the computing device to:
intercept, by a security application installed on a computing device, an original message intended for a target application installed on the same computing device, wherein the original message comprises potentially malicious content and wherein the potentially malicious content comprises a universal resource locator (URL);
forward, by the security application, the original message to a security service; and
receive, from the security service, a clean message, wherein the clean message comprises a safe representation of the potentially malicious content, wherein the clean message comprises the same URL, and wherein the security service comprises a proxy server configured to serve the safe representation of the potentially malicious content identified by the URL to the computing device.

19. The non-transitory computer-readable medium of claim 18, wherein the computer-executable instructions further cause the computing device to:
filter the original message to determine that it is potentially malicious, wherein the original message is forwarded to the security service in response to a determination that the original message is potentially malicious.

20. The non-transitory computer-readable medium of claim 18, wherein the computer-executable instructions further cause the computing device to:
register the security application with an operating system to intercept messages intended for the target application.

* * * * *